US012751368B2

(12) United States Patent
Somarowthu et al.

(10) Patent No.: US 12,751,368 B2
(45) Date of Patent: Oct. 6, 2026

(54) KERNEL PROCESSOR ADJUSTMENT USING CROP CONSTITUENTS

(71) Applicant: Deere & Company, Moline, IL (US)

(72) Inventors: Mahesh Somarowthu, Pune (IN); Noel W. Anderson, Fargo, ND (US)

(73) Assignee: Deere & Company, Moline, IL (US)

(*) Notice: Subject to any disclaimer, the term of this patent is extended or adjusted under 35 U.S.C. 154(b) by 372 days.

(21) Appl. No.: 18/483,131

(22) Filed: Oct. 9, 2023

(65) Prior Publication Data

US 2025/0113774 A1 Apr. 10, 2025

(51) Int. Cl.
*A01D 43/00* (2006.01)
*A01D 41/127* (2006.01)
*A01D 43/08* (2006.01)
*A01D 43/10* (2006.01)

(52) U.S. Cl.
CPC ......... *A01D 43/085* (2013.01); *A01D 43/081* (2013.01); *A01D 43/102* (2013.01)

(58) Field of Classification Search
CPC .............. A01D 41/127; A01D 41/1274; A01D 43/085; A01D 43/081; A01D 43/102; A01F 29/09
See application file for complete search history.

(56) References Cited

U.S. PATENT DOCUMENTS 6,449,932 B1 9/2002 Cooper et al.
11,564,349 B2 1/2023 Bonefas et al.
2006/0191251 A1* 8/2006 Pirro ...................... A01F 29/09 56/60
2011/0203243 A1* 8/2011 Finkler ................ F02D 31/001 56/10.8
2016/0029561 A1 2/2016 Fischer et al.
2020/0128735 A1 4/2020 Bonefas et al.
2022/0022375 A1 1/2022 Murray et al.
2022/0132736 A1 5/2022 Meyers et al.

FOREIGN PATENT DOCUMENTS

DE 102018213215 A1 2/2020
DE 102021117470 A1 1/2022
DE 102021116118 A1 12/2022
EP 2232978 B1 12/2011

(Continued)

OTHER PUBLICATIONS

Goeser, "The current state of kernel processing," Hay & Forage Grower, dated Feb. 2022 (3 pages).

(Continued)

*Primary Examiner* — Matthew Troutman
*Assistant Examiner* — Robert E Pezzuto
(74) *Attorney, Agent, or Firm* — Tucker Ellis LLP

(57) ABSTRACT

A kernel processor adjustment system and technique is provided. Material processed by a kernel processor is measured with a sensor assembly having one or more sensors. One or more properties are determined from sensor data and the properties are employed to determine a characteristic of the processed material. The characteristic is evaluated based on a performance metric. Based on the evaluation, adjusted settings of the kernel processor are determined. Control signals for the kernel processor are generated and communicated to execute the setting change.

19 Claims, 5 Drawing Sheets

(56) References Cited

FOREIGN PATENT DOCUMENTS

EP 3646703 B1 2/2022

OTHER PUBLICATIONS

Braman, et al., "Effect of corn silage kernel processing score on dairy cow starch digestibility, Animal Health and Nutrition," dated Oct. 21, 2016 (4 pages).
Rasmussen, et al., "Maize Silage Kernel Fragment Estimation Using Deep Learning-Based Object Recognition in Non-Separated Kernel/Stover RGB Images," Sensors 2019, 19, 3506, dated Aug. 10, 2019 (20 pages).
Seglar, "Get higher-value corn silage with proper kernel processing," AG Proud, dated Aug. 6, 2015 (6 pages).
Ferraretto, et al., "Meta-analysis: Effect of corn silage harvest practices on intake, digestion, and milk production by dairy cows," The Professional Animal Scientist, 28, (2012): pp. 141-149, Department of Dairy Science, University of Wisconsin-Madison (10 pages).
Liu, et al., "Terahertz radiation-enhanced-emission-of-fluorescence," Bloomberg Tradebook, LLC, The Institute of Optics, University of Rochester, Higher Education Press and Pringer-Verlag Berlin Heidelberg, dated Jan. 15, 2014 (43 pages).
Dairyland Laboratories, Inc. "Corn Silage Processing Score," undated (1 page).
Drewry, et al., "Predicting kernel processing score of harvested and processed corn silage via image processing techniques," Science Direct, Computers and Electronics in Agriculture, vol. 160, dated May 2019, pp. 144-152 (8 pages).
John Deere spec sheet for John Deere HarvestLab 300, HarvestLab and Constituent Sensing, https://www.deere.com/en/technology-products/precision-ag-technology/data-management/harvest-lab-constituent-sensing/ (3 pages).
Extended European Search Report and Written Opinion issued in European Patent Application No. 24177896.8 dated Nov. 18, 2024, in 09 pages.

* cited by examiner

KERNEL PROCESSOR ADJUSTMENT USING CROP CONSTITUENTS

BACKGROUND

A kernel processing unit, in some examples, includes two rollers that are positioned with a gap to receive a cut crop. As the cut crop travels between the rollers of kernel processing unit, the rollers crush the kernels into smaller pieces or fragments. The rollers may operate at different speeds. In this way, as material passes between the rollers, the rollers produce a grinding effect. This type of kernel processing operation affects feed quality of corn silage.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a system is provided. The system includes a sensor assembly configured to measure one or more properties of a processed material after processing by a processing unit. The system also includes any of one or more processors being configured to receive sensor data from the sensor assembly, the sensor data being indicative of the one or more properties of the processed material; analyze the sensor data to determine at least one characteristic of the processed material; evaluate the at least one characteristic of the processed material based on a target; determine an adjusted setting for the processing unit based on the evaluation; and communicate a control signal based on the adjusted setting.

In another implementation, a system is provided. The system includes a kernel processor configured to process a crop and output a processed crop. Also, the system includes a sensor assembly configured to measure one or more properties of the processed crop. In addition, the system includes any of one or more processors being configured to analyze sensor data from the sensor assembly to determine at least one characteristic of the processed crop; evaluate the at least one characteristic of the processed crop relative to a configured target; and determine an adjusted setting for the kernel processor based on the evaluation.

In yet another implementation, an agricultural machine is provided. The agricultural machine includes a cutter configured to cut a crop in a field to harvest the crop, a chopper configured to further chop harvested crop, and a kernel processor configured to process harvested crop to provide processed crop. In addition, the agricultural machine includes an operator interface configured to output information to an operator and receive input from the operator and a sensor assembly configured to measure one or more properties of the processed crop output by the kernel processor. Further, the agricultural machine includes any of one or more processors being configured to receive sensor data from the sensor assembly, the sensor data being indicative of the one or more properties of the processed crop; analyze the sensor data to determine a kernel processing score of the processed crop; evaluate the kernel processing score of the processed crop based on a target, wherein the target is at least one of a target kernel processing score or a target value of a function of the kernel processing score; determine an adjusted setting for the kernel processor based on the evaluation; and communicate a control signal to the kernel processor based on the adjusted setting.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

Various non-limiting embodiments are further described in the detailed description given below with reference the accompanying drawings, which are incorporated in and constitute a part of the specification.

DETAILED DESCRIPTION

Figure 1:
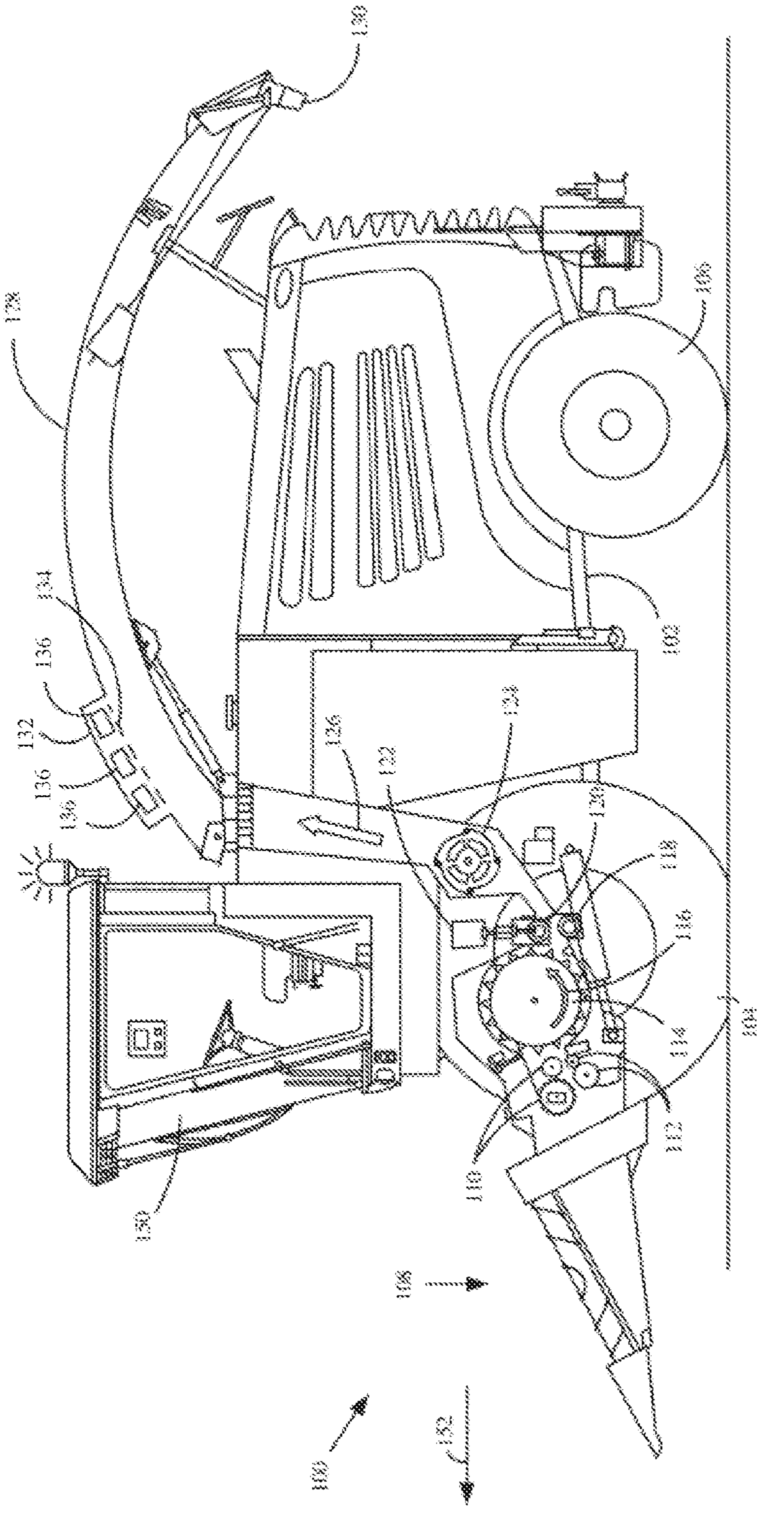
FIG. 1 illustrates an exemplary, non-limiting implementation of an agricultural machine according to various aspects.

As described above, kernel processing operations on a crop impacts feed quality of the crop. For instance, kernels that have been broken into small pieces by the kernel processing unit are more digestible. For livestock, improved digestibility improves meat quality. Further, for dairy cattle, increased digestibility may result in higher milk production. Conversely, unbroken kernels, or kernels broken into relatively large pieces, are less digestible.

Increasing the level of processing (i.e. breaking the crop into smaller pieces) requires input of a greater amount of energy. This increase can increase the load on an agricultural machine provisioned with a kernel processing unit. Accordingly, there is a trade-off where increased digestibility also means increased energy costs.

One metric for quantifying the efficiency of a kernel processing unit is a corn silage processing score (CSPS) or kernel processing score (KPS). To determine a CSPS or KPS value, a sample of silage may be sent to a laboratory, where the sample is dried then sieved through a machine having several different sieves with different hole sizes. A kernel portion that falls through a 4.75 mm sieve, for example, is a numerator of the CSPS/KPS value. A total kernel portion sieved is a denominator of the CSPS/KPS value. Accordingly, the greater the kernel portion through the 4.75 mm sieve, the higher the CSPS/KPS value.

A higher CSPS/KPS value correlates to better digestibility, which leads to the benefits above (e.g. improved milk production and meat quality). Power usage to process a crop with the kernel processing unit varies with a size of a gap between rollers of the kernel processing unit and a speed differential between the rollers. For instance, power usage may be approximately 180-200 kW for an 11 inch roll kernel processor, a 950 horsepower machine, and a 20 mm length of cut. The power consumption increases approximately 25% to gain an additional 5%. In other words, a KPS to power usage curve tends to flatten from 70-100%. Thus, beyond approximately 70%, the power usage increases more than the KPS gain.

A kernel processor adjustment system and techniques are described herein. The system and techniques avoid plugging of the kernel processor, improve a quality of cracked kernels, reduce fuel consumptions, and/or decrease an environmental impact per unit of product (e.g., lower greenhouse gas emissions, etc.). Various sensors and/or imaging devices can be utilized to measure processed crop after passing through the kernel processor. A kernel processor score and/or other metrics for the processed crop can be determined from sensor and/or imaging data. Based on the kernel processor score or metric, various adjustments, such as adjustments to a gap distance or speed, can be determined. As described below, the adjustments may be triggered based on an evaluation of the kernel processor score or metric to a target. The technique described herein provides precise and automatic adjustments to a kernel processor. The adjustments factor in fuel consumption and/or environmental impact. Thus, the system and techniques described herein lower fuel consumption and reduce emissions, while eliminating manual control or operator errors.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Referring initially to FIG. 1, an exemplary, non-limiting implementation of an agricultural machine 100 is illustrated. In an example, the agricultural machine 100 may be a forage harvester. As shown in FIG. 1, agricultural machine 100 includes a mainframe 102 that is supported by ground engaging elements, such as front wheels 104 and rear wheels 106. The wheels 104, 106 can be driven by an engine (or other power source) through a transmission. The wheels 104, 106 may be driven by individual motors (such as individual hydraulic motors) or via other techniques.

Agricultural machine 100 includes an operator compartment 150. Operator compartment 150 may have a plurality of different operator interface mechanisms such as, but not limited to, pedals, a steering wheel, user interface display devices, touch sensitive display screens, a microphone and speech recognition components, speech synthesis components, joysticks, levers, buttons, as well as various other mechanical, optical, haptic or audio interface mechanisms. During operation, the machine moves in the direction generally indicated by arrow 152.

A header 108 is mounted on the forward part of agricultural machine 100 and includes a cutter that cuts or severs the crop being harvested. The crop is passed to upper and lower feed rolls 110 and 112, respectively, which move the harvested material to a chopper 114. In the exemplary implementation depicted in FIG. 1, chopper 114 is a rotatable drum with a set of knives mounted on its periphery. The chopper 114 rotates generally in the direction indicated by arrow 116. Chopper 114 chops the harvested material received through rollers 110, 112 into pieces, and feeds the chopped material to a kernel processing unit having kernel processing rollers 118 and 120. The kernel processing rollers 118 and 120 are separated by a gap and are driven by one or more different motors (see FIG. 2) that drive the rollers at different rotational speeds. Therefore, as the chopped, harvested material is fed between rollers 118 and 120, the rollers 118, 120 crush and grind the material (including the kernels) into fragments.

In one example, at least one of the rollers 118 and 120 is mounted for movement under control of an actuator 122. Actuator 122 may be, for example, an electric motor, a hydraulic actuator, or any other actuator configured to drive movement of at least one of the rollers relative to the other. This movement changes the size of the gap between rollers 118 and 120, which may be referred to as the kernel processing gap. When the gap size is reduced, the kernels may be broken into smaller fragments. When the gap size is increased, the kernels may be broken into larger fragments, or even remain unbroken if the gap is large enough. The kernel processing rollers 118 and 120 may have surfaces that are relatively cylindrical. Alternatively, the surfaces of each roller can have fingers or knives protruding therefrom. The surface features of one roller may cooperate with features of the other roller, for example, in an interdigitated fashion, as the rollers turn. These arrangements or configurations are exemplary, and it is to be appreciated that other arrangement or configurations may be employed with the techniques described herein.

The processed crop is then transferred by rollers 118, 120 to a conveyor 124. Conveyor 124 may be, but is not limited to, a fan, an auger, or any other conveyor that can convey harvested and processed material generally upwardly in the direction indicated by arrow 126 through a chute 128. The harvested and processed crop may exit chute 128 through a spout 130.

In the exemplary implementation shown in FIG. 1, chute 128 includes sensor housing 132 positioned on a side thereof. The sensor housing 132 may be separated from the interior of chute 128 by an optically or other energy permeable barrier 134. Barrier 134 can be, for instance glass, plastic, or another barrier that permits the passage of at least certain wavelengths of electromagnetic radiation therethrough. Housing 132 illustratively includes one or more sensors or imaging units 136. As described herein, sensors or imaging units 136 may include a near infrared (NIR) sensor, a terahertz sensor, a constituents sensor, an ultraviolet sensor, and/or an optical camera. Each sensor may, for example, include a corresponding radiation source and radiation sensor and/or an imaging capturing sensor. The radiation source illuminates the crop passing through chute 128 with a wavelength of radiation (e.g. NIR, UV, THz, etc.). The radiation sensor detects reflected or transmitted radiation from the crop. An imaging device may capture an optical image of the crop. As discussed later, based on the image and/or other sensor data (e.g. sensed radiation), various properties of the harvested crop passing through chute 128 may be identified. For example, a size distribution indicative of the distribution of the size of the kernels or kernel fragments in the harvested may be determined. In other examples, other constituents of the crop may be measured such as, but not limited to, moisture content, dry matter content, acid detergent fiber (ADF), neutral detergent fiber (NDF), lignin, metabolized energy, crude protein, starch, etc. The sensors 136 may provide data indicative of properties that may be analyzed to determine constituents of cracked/uncracked kernels, to group kernels by size and/or color, and/or to classify kernels. As described below, the information derived from sensor data may be used to control a speed differential of rollers 118 and 120, and/or the size of the gap between rollers 118 and 120. Further, the information may be used in connection with location data to generate a constituent map, based upon the size distribution of kernels and kernel fragments.

It should be appreciated that, in other implementations, a sample of the crop can be diverted into a separate chamber, where its motion is momentarily stopped so the sensors may measure the properties of the crop and/or acquire images thereof. The crop can then be passed back into the chute 128 where it continues to travel toward spout 130.

Figure 2:
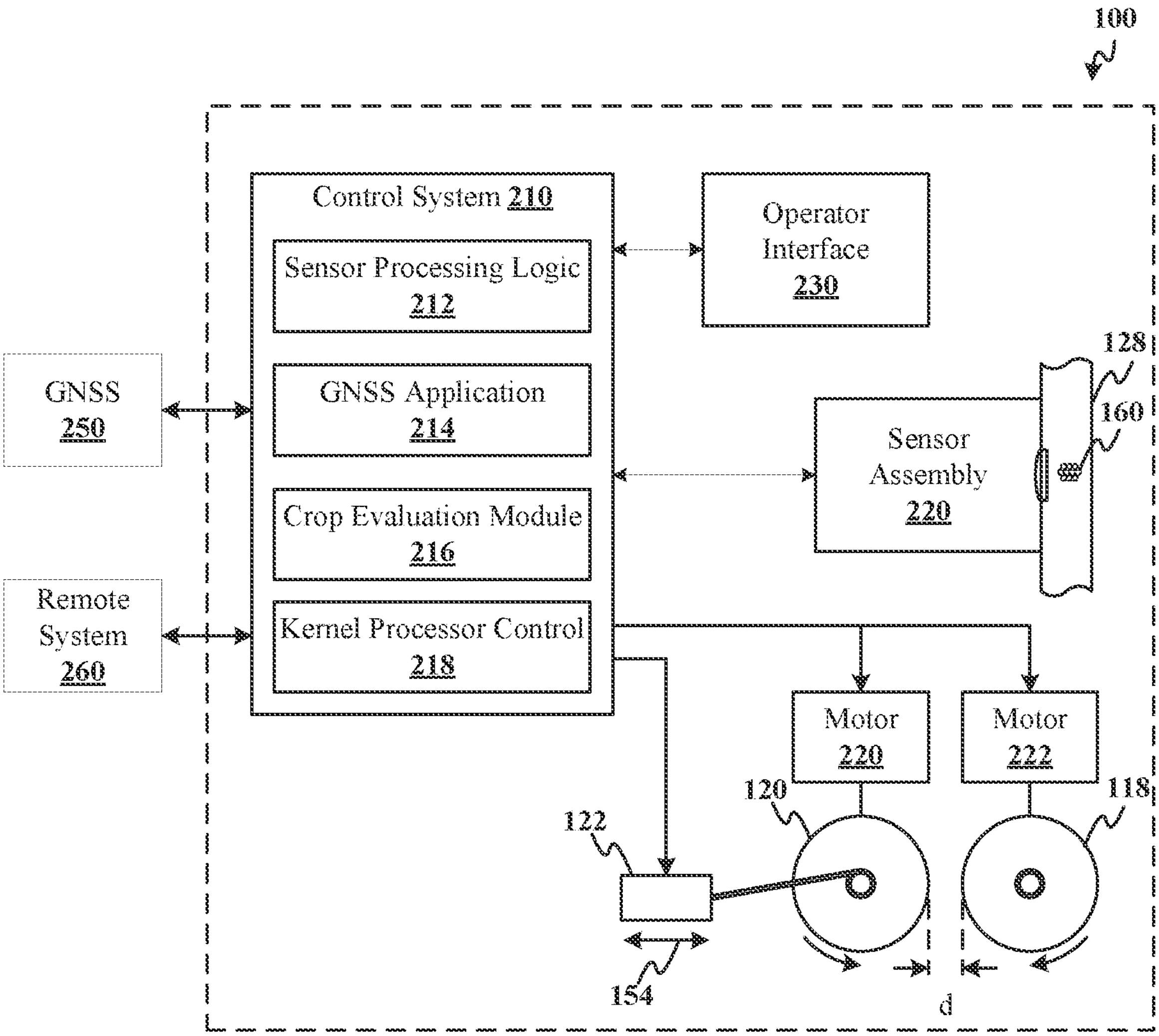
FIG. 2 illustrates a block diagram of an exemplary, non-limiting implementation of an agricultural machine according to various aspects.

Turning now to FIG. 2, illustrated is a block diagram of some parts of agricultural machine 100 according to various aspects. As shown in FIG. 2, harvested crop passes through a gap having a width “d” between kernel processing rollers 118 and 120. An actuator 122 can be actuated to move generally in the direction indicated by arrow 154 to change the size of gap “d” between rollers 118 and 120. After the crop is processed by rollers 118 and 120, the processed material enters chute 128 where it passes sensor assembly 220. FIG. 2 illustratively shows sensor assembly 220 measuring a crop sample 160.

FIG. 2 further shows other components such as an operator interface 230, a control system 210, motors 220 and 222, and other components separate from the agricultural machine 100 such as a global navigation satellite system (GNSS) 250 and a remote system 260. Operator interface 230 may include various types of different operator interface mechanisms that generate outputs for an operator and allow an operator to provide inputs to control agricultural machine 100. Control system 210 may include functional modules such as a sensor processing logic 212, a GNSS application 214, a crop evaluation module 216, and a kernel processor control 218.

Sensor processing logic 212 receives sensor data from sensor assembly 220. The sensor data includes data indicative of one or more properties of crop sample 160. The sensor assembly 220 may include a sensor configured to measure and/or detect a variety of properties of the crop. Such properties include, for example, moisture content, dry matter content, acid detergent fiber (ADF), neutral detergent fiber (NDF), lignin, metabolized energy, and crude protein. Constituent sensor can be a near-infrared-reflectance (NIR) sensor, among other type of any suitable sensing technologies. The sensor assembly 220 may include one or more sensors such as a near-infrared reflectance (NIR) sensor, a terahertz sensor, a moisture sensor, a visible light camera, a UV light sensor, and/or combinations thereof.

In some implementations, sensor assembly 220 may be, or configured similar to, a HARVESTLAB™ 3000 from JOHN DEERE®. Further, sensor assembly 220 may include additional sensor to further supplement the information measured from the crop sample 160. For instance, the sensor assembly 220 can be or include a terahertz sensor configured to generate and detect electromagnetic radiation with a frequency between 0.1 Thz to 30 Thz, which can be defined herein as Terahertz electromagnetic radiation (spectroscopy). Terahertz radiation is subject to significant laboratory research and shows promise for agricultural applications. Terahertz radiation provides the advantage of at least partial penetration into objects, but is not considered ionizing radiation, like X-rays. As such, Terahertz radiation does not trigger a requirement for a safety officer, nor is it subject to significant regulations, such as those that apply to X-rays. However, Terahertz electromagnetic radiation may provide improved detection abilities over optical techniques, IR and UV. Detected electromagnetic waves are converted to electronic signals (e.g. sensor data). Further, sensor assembly 220 may include a visible light camera providing data indicative of size or other constituents.

Thus, sensor assembly 220 may include one or more sensors respectively measuring different wavelengths of electromagnetic radiation reflected/transmitted/absorbed by the crop sample 160, and/or measuring other properties of crop sample (e.g., size, moisture, color, etc.). Sensor assembly 220 provides signals and/or sensor data indicative of measurements of crop sample 160 to sensor processing logic 212, which determines the one or more properties of crop sample 160 indicated by the sensor data.

In one aspect, the crop evaluation module 216 may determine at least one characteristic of the crop sample 160 based on the one or more properties determined by the sensor processing logic 212. In one example, the at least one characteristic may be a size distribution of kernels or kernel fragments in the crop sample 160. In another example, the at least one characteristic may be a KPS value for the crop sample 160. It is to be appreciated that the at least one characteristic may include multiple characteristics such a size distribution and the KPS value. The GNSS application 214 may acquire location information associated with the crop sample 160. For instance, the GNSS application 214 may obtain a location from GNSS 250 where the agricultural machine 100 harvested the crop sample 160. The at least one characteristic determined by the crop evaluation module 216 may be combined with the obtained location to generate a map (e.g. a constituent map). The map, for instance, may be indicative of the at least one characteristic over a harvested area (e.g. a field) through aggregation of measurements from a plurality of samples 160 from the area in combination with acquired location information. The map may also be generated from the one or more properties determined by the sensor processing logic 212. Thus, the generated map could be a map of any of the one or more properties described above, a map of KPS, a map of kernel or fragment size, or combinations of the properties or characteristics.

The crop evaluation module 216 may utilize the at least one characteristic to determine a performance or efficiency of the kernel processing unit. The performance or efficiency determined is utilized to determine an adjusted setting and/or effect control of the kernel processing unit by the kernel processor control 218.

In one aspect, the one or more properties, the at least one characteristic, the generated maps, the adjusted setting, and/or the performance or efficiency may be communicated to a remote system 260. Further, the same outputs may be provided to the operator interface 230. Accordingly, the operator may supervise, confirm, and/or manually control the agricultural machine 100 based on the information. For example, the control system 210 may output an indicator to the operator interface 230 of a processing level (e.g. cracking amount). That is, the indicator may inform the operator that the kernel processing unit is over cracking (over processing), under cracking (under processing), or is providing a normal cracking (normal processing).

In another aspect, the adjusted setting may be a gap size. The kernel processor control 218 may determine an adjusted gap size based on the evaluation performed by the crop evaluation module 216. The kernel processor control 218 may generate control signals that can be communicated to actuator 122. Actuator 122 drive movement of roller 120 relative to roller 118 to change a size of gap “d”. Actuator 122 may be a linear actuator (electric or hydraulic actuator), or any other suitable actuator capable of changing the relative distance between rollers 118, 120.

In another aspect, the adjusted setting may a relative speed (e.g., speed differential between rollers 118, 120). The kernel processor control 218 may determine an adjusted speed for motor 220 and/or motor 222 that respectively drive roller 120 and roller 118. The kernel processor control 218 may generate control signals and communicate the control signals to the motors 220 and/or 222 to carry out a speed adjustment for the kernel processing unit.

Moreover, the kernel processor control 218 may receive inputs from various sensors or devices (not shown) that indicate current speeds or gap sizes. Based on these inputs, the kernel processor control 218 may determine the adjusted setting to drive a change in the at least one characteristic or other performance metric determined by the crop evaluation module 216.

In another aspect, sensor assembly 220 may provide sensor data indicative of a contaminant or other undesired material in crop sample 160. The detection of the contaminant may be performed by sensor processing logic 212 based on the sensor data. The detection event may be provided to kernel processor control 218, which controls a diverter (not shown) to remove the contaminant from the crop sample 160.

In yet another example, the crop evaluation module 216 generates a performance or efficiency evaluation of the kernel processing unit by evaluating the least one characteristic determined relative to a target. For example, for under/normal/over cracking indicator, the crop evaluation module 216 determines the performance metric based on a target size distribution. In another example, for a KPS value, the crop evaluation module 216 may utilize a operational target or optimize based on a value function.

A KPS greater than 70%, for example, is desirable in terms of digestibility. As noted above, increased power input is needed to gain a relatively smaller gain in KPS beyond 70%. Accordingly, the crop evaluation module 216 can evaluate the KPS value determined relative to a target of 70%. Thus, the control system 210 may adjust the kernel processing unit to increase or decrease the KPS value to maintain a value of approximately 70%. Utilizing a fixed target balances fuel consumption and other factors (environmental impacts) with digestibility or quality of the product. The target may be a configurable setting in agricultural machine 100 to enable kernel processing that maintains a KPS value at other levels.

In another aspect, crop evaluation module 218 may utilize a KPS value in connection with a value function. In this example, the crop evaluation module 218 determines a desired performance for the kernel processing based on a value derived from the product produced. One example of a value function is the following:

Value $=(milk-meat $/kg feed (KPS)−kernel processing hardware cost (KPS) $/kg feed−kernel processing energy cost (KPS) $/kg feed)*kg feed+environmental services payment $ In this example, milk-meat $/kg feed (KPS) represents the monetary value of the milk or meat generated per kg of feed as a function of the KPS. In the examples described herein, "$" denotes unit of "United States Dollars" for the associated value. It is to be appreciated that other denominations, currencies, or value units may be substituted. As the KPS goes up, the Feed Conversion Efficiency goes up and more product is produced per kg of feed. In some example, the value could be a simple generic function of KPS. In another examples, the value may be a more involved function that considers one or more crop characteristics or properties (e.g., constituents, moisture, length of cut crop, etc.), livestock characteristics (e.g., breed, sex, age, lactation cycle stage, etc.), environmental characteristics (e.g., expected air temperature, containment such as stanchions vs feedlot vs pasture, ground surface such concrete vs mud, etc.), and the like.

The parameter, kernel processing hardware cost (KPS) $/kg feed, represents a monetary depreciation cost associated with each kg of feed processed. This term could be a constant or could be a function considering factors such as forces associated with material passage gaps, crop throughput, or the like.

The term, kernel processing energy cost (KPS) $/kg feed, represents the energy cost of processing a kg of feed which typically goes up as processing rollers are brought closer together. As the KPS exceeds 70%, the energy cost is expected to go up faster than the benefit of improved digestibility. This term could be a simple function of KPS or could also consider crop characteristics (e.g., variety, maturity, constituents, grain/Mog ratio, chop length, moisture, density, etc.), fuel characteristics (e.g., type, cost, etc.), and equipment characteristics (e.g., kernel processor model, crop throughput, roller gaps, shear bar or other component wear, etc.), and other similar properties. Kernel processors can use up to around 20% of power of a self-propelled forage harvester.

The parameter, environmental services payment $, represents a payment (and/or tax) and may take several forms, alone or in combination, such as: flat rate translated to kg of feed for following certain practices such as minimum KPS of harvested crop; variable rate translated to kg of feed for parameters such as KPS, a feed to GHG model; equipment $CO_2$ emissions; or the like.

It is to be appreciated that the above function is one example and other functions may be implemented. Further, other formulas, fuzzy rules, models, neural networks, or other techniques may be employed to generate a value derived from the product in controlling settings of a kernel processing unit.

In other implementations, for business use or for regulation compliance, various data may be collected. Some of this data may be georeferenced. Some of this data may be collected and transmitted in ways that preserve authenticity or make tampering with the data evident. For example, the system may utilize blockchain, NFTs, Physically Unclonable Functions, data encryption, etc.

Figure 3:
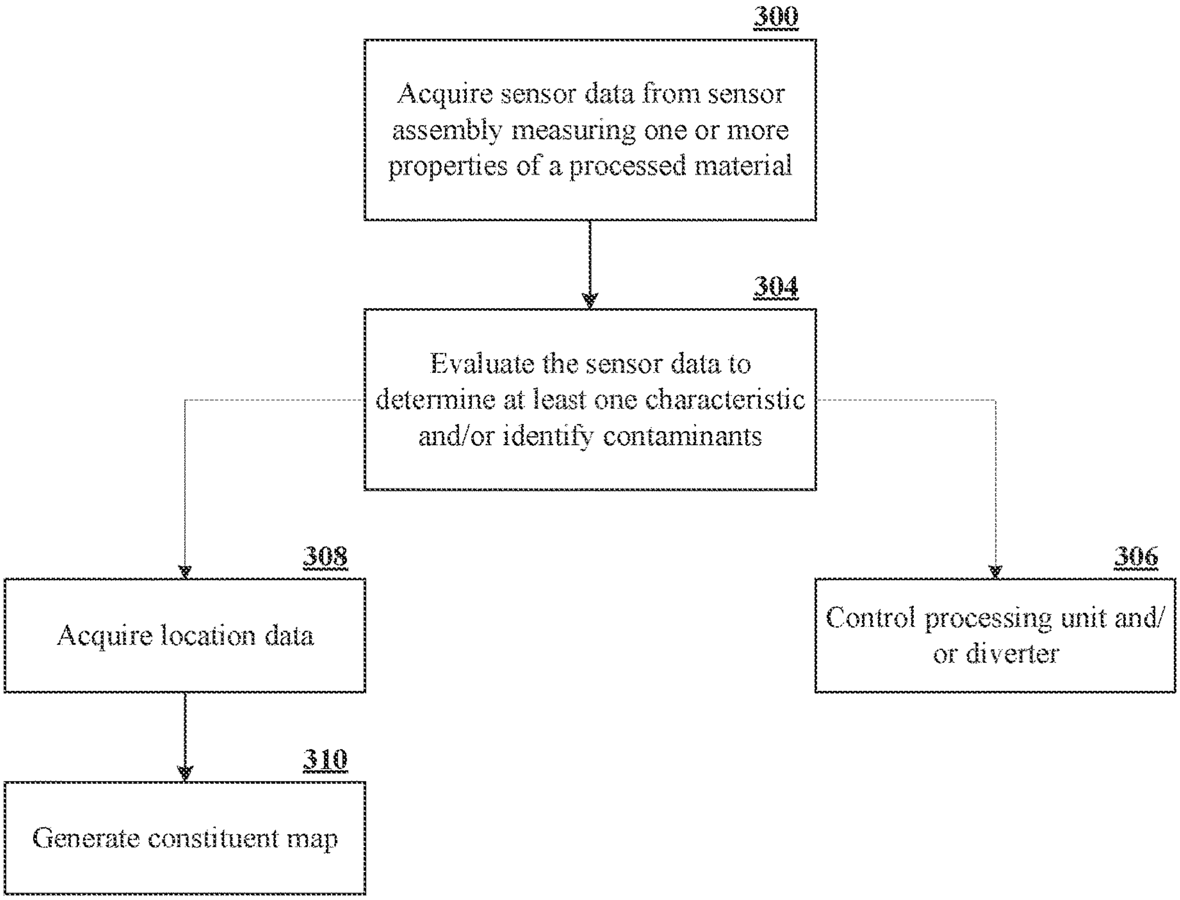
FIG. 3 is flow chart of an exemplary, non-limiting implementation for controlling a kernel processing operation in accordance with various aspects.
Figure 4:
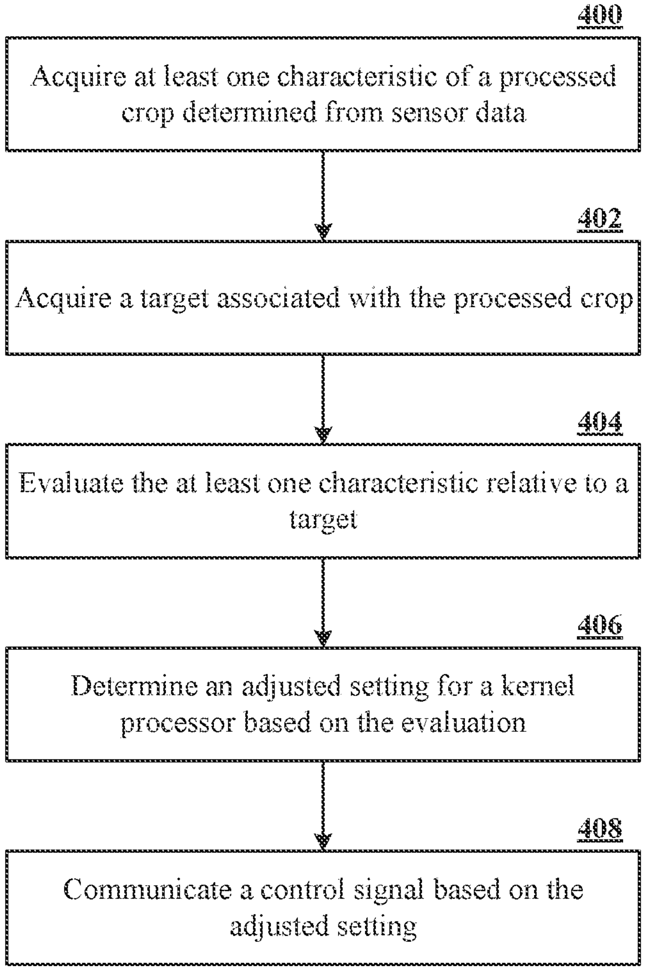
FIG. 4 illustrates a flow chart of an exemplary, non-limiting implementation for adjusting a kernel processing operation based on determined characteristics of a crop according to various aspects.

Turning to FIGS. 3 and 4, various features and operations of the systems described above are illustrated with exemplary flowcharts. The examples in these figures are illustrative of some features of system 100, but are not exhaustive. Moreover, it is to be appreciated that the methods shown in FIGS. 3 and 4 are not mutually exclusive. Steps of one method may be performed in parallel with steps of the other methods. In addition, the methods in FIGS. 3 and 4 may be interleaved such that steps of the various methods may occur in other orders than those shown in the figures and steps in one method may occur sequentially with steps of other methods. One of ordinary skill in the art will appreciate the manner in which the methods of FIGS. 3 and 4 may combine.

Referring now to FIG. 3, a flowchart of a method for controlling a kernel processing operation is illustrated. The method of FIG. 3, in some implementations, may be performed by agricultural machine 100, control system 210, and/or other computing device or controller associated with or in communication with the agricultural machine 100. The method can begin at reference numeral 300 where sensor data is acquired from a sensor assembly. As noted above, the sensor assembly may include one or more sensors of varying types configured to measure one or more properties of a processed material (e.g. a harvested and processed crop), or provide data indicative of the one or more properties. At 304, the sensor data is evaluated to determine at least one characteristic and/or to identify contaminants. In one example, at 306, the at least one characteristic is employed to control one or more settings of the kernel processing unit. The control may be manual, semi-automated, or fully automated. With manual, a recommendation for the adjusted setting or other performance indicator is output to an operator. The operator may subsequently render the appropriate change. In a semi-automated mode, a controller autonomously executes the adjusted setting while notifying the operator. Here, the operator is alerted to the change and may override or accept. In this way, the operator maintains supervisory control of automated adjustments. In a full automation mode, the system executes the adjustments with full autonomy.

Also, an identification of contaminants triggers control of a diverter to remove the contaminants. In another example, the at least one characteristic is combined with location data acquired at 308 to generate a constituent map at 310. The constituent map may provide a map of the at least one characteristic over an area (e.g. field) where the harvested and processed crop was obtained.

Turning to FIG. 4, illustrated is an exemplary method for adjusting a kernel processing operation based on determined characteristics of a crop. The method of FIG. 4, in some implementations, may be performed by agricultural machine 100, control system 210, and/or other computing device or controller associated with or in communication with the agricultural machine 100. The method may begin at 400 where at least one characteristic of a processed crop (determined from sensor data) is acquired. At 402, a target associated with the processed crop is acquired. The target may be an operational target or threshold to be maintained by the machine. In another example, the target may be derived from a value function utilized to balance various factors. In some examples, the target may be a single value, e.g., KPS=73%. In some examples, the target may be defined as a range of values, e.g., 70%<KPS<75%. These values are merely exemplary to describe one implementation. The concepts described herein are not limited to these specific implementations. At 404, the at least one characteristic is evaluated relative to the target. For example, the at least one characteristic is checked against the operation target or threshold to determine if the processed crop falls below/at/over the target. In another example, the value function may be evaluated with the at least one characteristic. At 406, an adjusted setting for a kernel processor is determined based on the evaluation. For example, the adjusted setting may indicate a smaller gap when the at least one characteristic indicates a particle size greater than desired. Alternatively, the adjusted setting may indicate a larger gap when a gain in a value derived from the processed crop does not outweigh fuel consumption, environmental impact, or other costs associated with performance at the measured level. At 408, a control signal based on the adjusted setting is communicated to the kernel processor to executed an adjustment.

Figure 5:
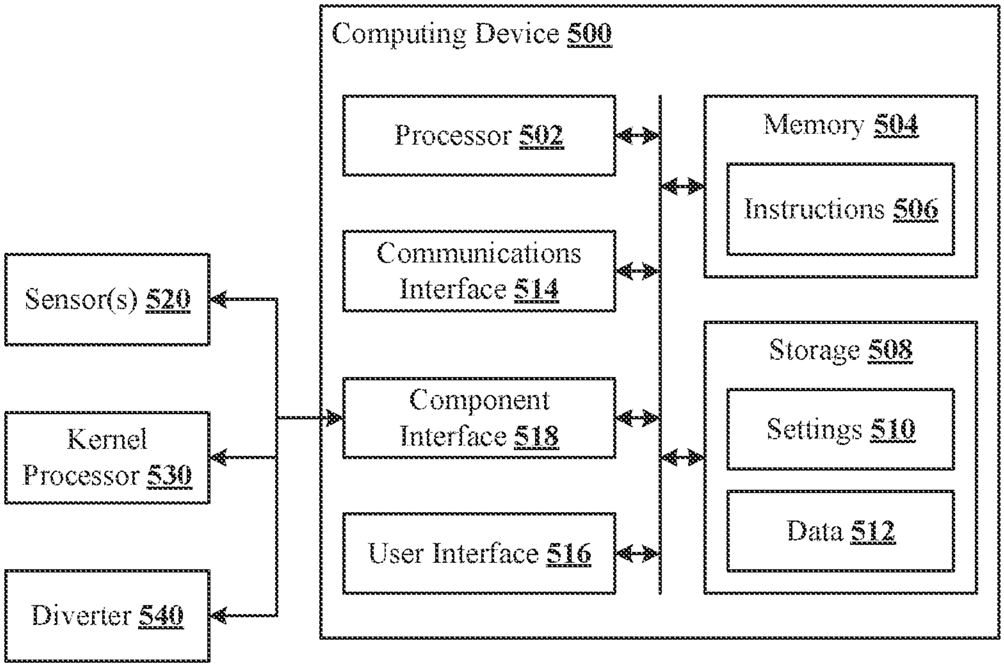
FIG. 5 is a schematic diagram of an exemplary, non-limiting implementation of a computing device according to various aspects.

Turning to FIG. 5, illustrated is a schematic block diagram of an exemplary, non-limiting implementation for the computing device 500. Computing device 500 may be utilized to implement control system 210, remote system 260, or other controller of agricultural machine 100. Computing device 500 includes a processor 502 configured to execute computer-executable instructions 506 such as instructions composing a kernel processing adjustment process the agricultural system 100. Such computer-executable instructions 506 can be stored on one or more computer-readable media including non-transitory, computer-readable storage media such as memory 504. Memory 504 can also include other data (working data or variables) or portions thereof during execution of instructions 506 by processor 502.

The computing device 500 can also include storage 508 that can be, according to an embodiment, non-volatile storage to persistently store instructions 506, settings 510 (e.g. configuration settings, target values, value functions) and/or data 912 (e.g., operational data, history data, sensor data from sensor assembly 220, learning models, determined crop properties, crop characteristics, etc.).

The computing device 500 may also include a user interface 516 that comprises various elements to obtain user input and to convey user output. For instance, user interface 516 can comprise of a touch display, which operates as both an input device and an output device. In addition, user interface 516 can also include various buttons, switches, keys, etc. by which a user can input information to computing device 500; and other displays, LED indicators, etc. by which other information can be output to the user. Further still, user interface 516 can include input devices such as keyboards, pointing devices, and standalone displays.

The computing device 500 further includes a communications interface 514 to couple computing device 500, via the a communications network, to various devices such as, but not limited to, other computing devices 500, remote system 260, agriculture machine 100, sensors 520, kernel processor 530, diverter 540, other controllers, servers, sensors, or Internet-enabled devices (e.g., IoT sensors or devices). Communication interface 514 can be a wired or wireless interface including, but not limited, a WiFi interface, an Ethernet interface, a Bluetooth interface, a fiber optic interface, a cellular radio interface, a satellite interface, etc.

A component interface 518 is also provided to couple computing device 500 to various components such as sensors 520, kernel processor 530, diverter 540, and/or agriculture machine 100. Component interface 518 can include a plurality of electrical connections on a circuit board or internal bus of computing device 500 that is further coupled to processor 502, memory 504, etc. Component interface 518, in another embodiment, can be an interface for a CAN bus of agricultural vehicle 100. Further, the component interface 518 can implement various wired or wireless interfaces such as, but not limited to, a USB interface, a serial interface, a WiFi interface, a short-range RF interface (Bluetooth), an infrared interface, a near-field communication (NFC) interface, etc.

According to an aspect, a system is provided. In one implementation, a system is provided. The system includes a sensor assembly configured to measure one or more properties of a processed material after processing by a processing unit. The system also includes any of one or more processors being configured to receive sensor data from the sensor assembly, the sensor data being indicative of the one or more properties of the processed material; analyze the sensor data to determine at least one characteristic of the processed material; evaluate the at least one characteristic of the processed material based on a target; determine an adjusted setting for the processing unit based on the evaluation; and communicate a control signal based on the adjusted setting.

In an example, the processed material is a crop processed by a kernel processing unit of an agricultural machine. In another example, the at least one characteristic includes a kernel processing score. In a further example, any of the one or more processors are further configured to determine the adjusted setting for the processing unit to maintain the kernel processing score at a fixed target.

In another example, any of the one or more processors are further configured to determine the adjusted setting for the processing unit to maintain the kernel processing score based on a value function. The value function provides a value derived from the processed material having the kernel processing score given values associated with producing the processing material having the kernel processing score. The costs include at least one of equipment costs or energy costs. The value function further includes an environmental impact factor.

In yet another example, any of the one or more processors are further configured to receive position information indicative of a location at which material processed by the processing unit is collected; and associate at least one of the one or more properties or the at least one characteristic of corresponding processed material with the location. Further to this example, any of the one or more processors are further configured to construct a map indicative of the at least one of the one or more properties or the at least one characteristic of respective processed material over an area; and utilize the map to generate the adjusted setting for the processing unit.

Still further, the sensor assembly includes one or more of a near infrared sensor, a terahertz sensor, a visible light camera, or an ultraviolet light sensor. In addition, any of the one or more processors are further configured to output the adjusted setting to an operator. Also, any of the one or more processors are further configured to communicate the control signal responsive to operator input indicative of an instruction to make the adjustment. In yet another example, any of the one or more processors are further configured to analyze the sensor data to detect contaminants in the processed material and to communicate a signal to a diverter to separate the contaminants detected from the processed material.

In another aspect, a system is provided. The system includes a kernel processor configured to process a crop and output a processed crop. Also, the system includes a sensor assembly configured to measure one or more properties of the processed crop. In addition, the system includes any of one or more processors being configured to analyze sensor data from the sensor assembly to determine at least one characteristic of the processed crop; evaluate the at least one characteristic of the processed crop relative to a configured target; and determine an adjusted setting for the kernel processor based on the evaluation.

According to an example, the system also includes an operator interface. In this example, any of the one or more processors are further configured to output an indication of the adjusted setting to the operator interface; and communicate a control signal to the kernel processor based on the adjusted setting. Further, any of the one or more processors are further configured to communicate the control signal responsive to operator input indicative of an instruction to make the adjustment.

In another example, any of the one or more processors are further configured to autonomously communicate the control signal to the kernel processor. Further, in another example where the system includes an operator interface, any of the one or more processors are further configured to analyze sensor data from the sensor assembly to determine a level of processing achieved by the kernel processor; and output an indication of the level of processing to the operator interface.

In yet another implementation, an agricultural machine is provided. The agricultural machine includes a cutter configured to cut a crop in a field to harvest the crop, a chopper configured to further chop harvested crop, and a kernel processor configured to process harvested crop to provide processed crop. In addition, the agricultural machine includes an operator interface configured to output information to an operator and receive input from the operator and a sensor assembly configured to measure one or more properties of the processed crop output by the kernel processor. Further, the agricultural machine includes any of one or more processors being configured to receive sensor data from the sensor assembly, the sensor data being indicative of the one or more properties of the processed crop; analyze the sensor data to determine a kernel processing score of the processed crop; evaluate the kernel processing score of the processed crop based on a target, wherein the target is at least one of a target kernel processing score or a target value of a function of the kernel processing score; determine an adjusted setting for the kernel processor based on the evaluation; and communicate a control signal to the kernel processor based on the adjusted setting.

The foregoing description and examples has been set forth merely to illustrate the disclosure and are not intended as being limiting. Each of the disclosed aspects and embodiments of the present disclosure may be considered individually or in combination with other aspects, embodiments, and variations of the disclosure. In addition, unless otherwise specified, none of the steps of the methods of the present disclosure are confined to any particular order of performance. Modifications of the disclosed embodiments incorporating the spirit and substance of the disclosure may occur to persons skilled in the art and such modifications are within the scope of the present disclosure. Furthermore, all references cited herein are incorporated by reference in their entirety.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms “approximately”, “about”, and “substantially” may refer to an amount that is within less than or equal to 10% of the stated amount. The term “generally” as used herein represents a value, amount, or characteristic that predominantly includes or tends toward a particular value, amount, or characteristic. As an example, in certain embodiments, as the context may dictate, the term “generally parallel” can refer to something that departs from exactly parallel by less than or equal to 20 degrees.

Unless otherwise explicitly stated, articles such as “a” or “an” should generally be interpreted to include one or more described items. Accordingly, phrases such as “a device configured to” are intended to include one or more recited devices. Such one or more recited devices can be collectively configured to carry out the stated recitations. For example, “a processor configured to carry out recitations A, B, and C” can include a first processor configured to carry out recitation A working in conjunction with a second processor configured to carry out recitations B and C.

The terms “comprising,” “including,” “having,” and the like are synonymous and are used inclusively, in an open-ended fashion, and do not exclude additional elements, features, acts, operations, and so forth. Likewise, the terms “some,” “certain,” and the like are synonymous and are used in an open-ended fashion. Also, the term “or” is used in its inclusive sense (and not in its exclusive sense) so that when used, for example, to connect a list of elements, the term “or” means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although systems and methods for kernel processor adjustment have been disclosed in the context of certain embodiments and examples, this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of systems and methods for kernel processor adjustment. The scope of this disclosure should not be limited by the particular disclosed embodiments described herein.

Certain features that are described in this disclosure in the context of separate implementations can be implemented in combination in a single implementation. Conversely, various features that are described in the context of a single implementation can be implemented in multiple implementations separately or in any suitable subcombination. Although features may be described herein as acting in certain combinations, one or more features from a claimed combination can, in some cases, be excised from the combination, and the combination may be claimed as any subcombination or variation of any subcombination.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various embodiments described and the appended claims. Further, the disclosure herein of any particular feature, aspect, method, property, characteristic, quality, attribute, element, or the like in connection with an embodiment can be used in all other embodiments set forth herein. Any methods disclosed herein need not be performed in the order recited. Depending on the embodiment, one or more acts, events, or functions of any of the algorithms, methods, or processes described herein can be performed in a different sequence, can be added, merged, or left out altogether (e.g., not all described acts or events are necessary for the practice of the algorithm). In some embodiments, acts or events can be performed concurrently, e.g., through multi-threaded processing, interrupt processing, or multiple processors or processor cores or on other parallel architectures, rather than sequentially. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure. The use of sequential, or time-ordered language, such as “then,” “next,” “after,” “subsequently,” and the like, unless specifically stated otherwise, or otherwise understood within the context as used, is generally intended to facilitate the flow of the text and is not intended to limit the sequence of operations performed. Thus, some embodiments may be performed using the sequence of operations described herein, while other embodiments may be performed following a different sequence of operations.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described herein should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. Certain figures are drawn and/or shown to scale, but such scale should not be limiting, since dimensions and proportions other than what are shown are contemplated and are within the scope of the embodiments disclosed herein. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

The methods disclosed herein may include certain actions taken by a practitioner; however, the methods can also include any third-party instruction of those actions, either expressly or by implication.

In summary, various embodiments and examples of systems and methods for multiplex air cart have been disclosed.

Although the systems and methods for multiplex air cart have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described herein, but should be determined only by a fair reading of the claims that follow.

The invention claimed is:

1. A system, comprising:

a sensor assembly configured to measure one or more properties of a processed material after processing by a processing unit; and any of one or more processors being configured to:

receive sensor data from the sensor assembly, the sensor data being indicative of the one or more properties of the processed material;

analyze the sensor data to determine at least one characteristic of the processed material;

analyze the sensor data to detect contaminants in the processed material and to communicate a signal to a diverter to separate the contaminants detected from the processed material;

evaluate the at least one characteristic of the processed material based on a target;

determine an adjusted setting for the processing unit based on the evaluation; and communicate a control signal based on the adjusted setting; and, wherein the processed material is a crop processed by a kernel processing unit of an agricultural machine.

2. The system of claim 1, wherein the sensor assembly includes one or more of a near infrared sensor, a terahertz sensor, a visible light camera, or an ultraviolet light sensor.

3. The system of claim 1, wherein the at least one characteristic includes a kernel processing score.

4. The system of claim 3, wherein any of the one or more processors are further configured to determine the adjusted setting for the processing unit to maintain the kernel processing score at a fixed target.

5. The system of claim 3, wherein any of the one or more processors are further configured to determine the adjusted setting for the processing unit to maintain the kernel processing score based on a value function.

6. The system of claim 5, wherein the value function provides a value derived from the processed material having the kernel processing score given values associated with producing the processing material having the kernel processing score.

7. The system of claim 6, wherein the value function further includes at least one cost factor, the at least one cost factor includes least one of an equipment cost or an energy cost.

8. The system of claim 6, wherein the value function further includes an environmental impact factor.

9. The system of claim 1, wherein any of the one or more processors are further configured to:

receive position information indicative of a location at which material processed by the processing unit is collected; and associate at least one of the one or more properties or the at least one characteristic of corresponding processed material with the location.

10. The system of claim 9, wherein any of the one or more processors are further configured to:

construct a map indicative of the at least one of the one or more properties or the at least one characteristic of respective processed material over an area; and utilize the map to generate the adjusted setting for the processing unit.

11. The system of claim 1, wherein any of the one or more processors are further configured to output the adjusted setting to an operator.

12. The system of claim 11, wherein any of the one or more processors are further configured to communicate the control signal responsive to operator input indicative of an instruction to make the adjustment.

13. A system, comprising:

a kernel processor configured to process a crop and output a processed crop;

a sensor assembly configured to measure one or more properties of the processed crop; and any of one or more processors being configured to:

analyze the sensor data to detect contaminants in the processed crop and to communicate a signal to a diverter to separate the contaminants detected from the processed crop;

analyze sensor data from the sensor assembly to determine at least one characteristic of the processed crop;

evaluate the at least one characteristic of the processed crop relative to a configured target; and determine an adjusted setting for the kernel processor based on the evaluation.

14. The system of claim 13, wherein the at least one characteristic includes a kernel processing score, and wherein any of the one or more processors are further configured to determine the adjusted setting for kernel processor to maintain the kernel processing score based on a value function, wherein the value function provides a value derived from the processed material having the kernel processing score given cost values associated with producing the processing material having the kernel processing score.

15. The system of claim 13, further comprising an operator interface, wherein any of the one or more processors are further configured to:

analyze sensor data from the sensor assembly to determine a level of processing achieved by the kernel processor; and output an indication of the level of processing to the operator interface.

16. The system of claim 13, further comprising an operator interface, wherein any of the one or more processors are further configured to:

output an indication of the adjusted setting to the operator interface; and communicate a control signal to the kernel processor based on the adjusted setting.

17. The system of claim 16, wherein any of the one or more processors are further configured to communicate the control signal responsive to operator input indicative of an instruction to make the adjustment.

18. The system of claim 13, wherein any of the one or more processors are further configured to autonomously communicate the control signal to the kernel processor.

19. An agricultural machine, comprising:

a cutter configured to cut a crop in a field to harvest the crop;

a chopper configured to further chop harvested crop;

a kernel processor configured to process harvested crop to provide processed crop;

an operator interface configured to output information to an operator and receive input from the operator;

a sensor assembly configured to measure one or more properties of the processed crop output by the kernel processor;

any of one or more processors being configured to:

receive sensor data from the sensor assembly, the sensor data being indicative of the one or more properties of the processed crop;

analyze the sensor data to detect contaminants in the processed crop and to communicate a signal to a diverter to separate the contaminants detected from the processed crop;

analyze the sensor data to determine a kernel processing score of the processed crop;

evaluate the kernel processing score of the processed crop based on a target, wherein the target is at least one of a target kernel processing score or a target value of a function of the kernel processing score;

determine an adjusted setting for the kernel processor based on the evaluation; and communicate a control signal to the kernel processor based on the adjusted setting.

* * * * *